US011321783B2

(12) United States Patent
Wang

(10) Patent No.: US 11,321,783 B2
(45) Date of Patent: May 3, 2022

(54) METHOD AND DEVICE FOR DATA PROCESSING BASED ON BLOCKCHAIN

(71) Applicant: ADVANCED NEW TECHNOLOGIES CO., LTD., Grand Cayman (KY)

(72) Inventor: Haibin Wang, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 17/163,483

(22) Filed: Jan. 31, 2021

(65) Prior Publication Data
US 2021/0158454 A1 May 27, 2021

Related U.S. Application Data

(63) Continuation of application No. PCT/CN2019/119067, filed on Nov. 18, 2019.

(30) Foreign Application Priority Data

Dec. 21, 2018 (CN) .......................... 201811574828.2

(51) Int. Cl.
*G06Q 40/00* (2012.01)
*G06Q 40/08* (2012.01)
(Continued)

(52) U.S. Cl.
CPC ......... *G06Q 40/08* (2013.01); *G06F 16/2365* (2019.01); *G06F 16/28* (2019.01); *G06Q 10/10* (2013.01); *G06Q 20/389* (2013.01)

(58) Field of Classification Search
USPC ........ 705/4, 5, 39, 38, 37, 36; 235/375, 380, 235/379; 340/540; 719/328; 717/108;
(Continued)

(56) References Cited

U.S. PATENT DOCUMENTS 8,428,971 B2 * 4/2013 Peterie .................. G06Q 40/08
705/4
10,397,328 B2 * 8/2019 Bohli .................. H04L 67/1095
(Continued)

FOREIGN PATENT DOCUMENTS

CN 106600252 A 4/2017
CN 107251595 A 10/2017
(Continued)

OTHER PUBLICATIONS

Blockchain Technology in Data Management; 2020 Fourth International Conference on Computing Methodologies and Communication (ICCMC) (pp. 199-206); N.Arunkumar; P.Sivaprakasam; Mar. 1, 2020. (Year: 2020).*
(Continued)

*Primary Examiner* — Tien C Nguyen

(57) ABSTRACT

A method, a system, and a computer-readable storage medium for blockchain-based data processing are provided. The method comprises: by a node device of a service acceptance platform, receiving service processing application data of a target user; generating a first shared service processing result and a first private service processing result with respect to a target service data processing entity; sending a first transaction to a blockchain for the first transaction to be recorded in a distributed database of the blockchain upon verification of the first transaction by a plurality of node devices associated with the blockchain according to a consensus mechanism; and sending the first private service processing result to the node device of the target service data processing entity, for the node device of the target service data processing entity to generate a second service processing result.

20 Claims, 4 Drawing Sheets

(51) Int. Cl.
*G06F 16/28* (2019.01)
*G06F 16/23* (2019.01)
*G06Q 10/10* (2012.01)
*G06Q 20/38* (2012.01)

(58) Field of Classification Search
USPC .............................................. 715/704; 726/9
See application file for complete search history.

(56) References Cited

U.S. PATENT DOCUMENTS

| | | | | |
|---|---|---|---|---|
| 10,628,454 | B2* | 4/2020 | Gauvreau, Jr. | H04L 9/3239 |
| 10,643,202 | B2* | 5/2020 | Castinado | G06Q 20/382 |
| 10,963,400 | B2* | 3/2021 | Deshpande | G06F 21/10 |
| 2003/0139948 | A1* | 7/2003 | Strech | G06Q 40/00 |
| | | | | 705/4 |
| 2003/0187703 | A1* | 10/2003 | Bonissone | G06Q 10/10 |
| | | | | 705/4 |
| 2008/0312969 | A1* | 12/2008 | Raines | G06Q 40/08 |
| | | | | 705/4 |
| 2015/0039347 | A1* | 2/2015 | Sharma | G06Q 10/0833 |
| | | | | 705/4 |
| 2015/0356523 | A1 | 12/2015 | Madden | |
| 2016/0241402 | A1 | 8/2016 | Gordon et al. | |
| 2016/0292672 | A1* | 10/2016 | Fay | G06Q 20/3827 |
| 2017/0116693 | A1 | 4/2017 | Rae et al. | |
| 2017/0221029 | A1 | 8/2017 | Lund et al. | |
| 2017/0289111 | A1 | 10/2017 | Voell et al. | |
| 2017/0310653 | A1* | 10/2017 | Zhang | H04L 9/3242 |
| 2017/0337534 | A1 | 11/2017 | Goeringer et al. | |
| 2017/0345011 | A1* | 11/2017 | Salami | G06Q 20/10 |
| 2017/0366353 | A1* | 12/2017 | Struttmann | G06F 21/64 |
| 2018/0115426 | A1 | 4/2018 | Andrade | |
| 2018/0189878 | A1 | 7/2018 | Uhr et al. | |
| 2018/0260909 | A1 | 9/2018 | Li | |
| 2019/0068365 | A1 | 2/2019 | Wright et al. | |
| 2019/0180275 | A1 | 6/2019 | Safak | |
| 2019/0266145 | A1 | 8/2019 | Qiu et al. | |
| 2019/0287095 | A1 | 9/2019 | Gaddam et al. | |
| 2020/0034919 | A1* | 1/2020 | Qiu | G06Q 40/025 |
| 2021/0014072 | A1 | 1/2021 | Liu et al. | |

FOREIGN PATENT DOCUMENTS

| | | | |
|---|---|---|---|
| CN | 107292621 | A | 10/2017 |
| CN | 107341702 | A | 11/2017 |
| CN | 108389129 | A | 8/2018 |
| CN | 108520415 | A | 9/2018 |
| CN | 108667632 | A | 10/2018 |
| CN | 108694669 | A | 10/2018 |
| CN | 109313753 | A | 2/2019 |
| CN | 109478282 | A | 3/2019 |
| CN | 109697365 | A | 4/2019 |
| CN | 109919604 | A | 6/2019 |
| CN | 110009337 | A | 7/2019 |
| CN | 106982205 | B | 5/2020 |
| JP | 2019506074 | A | 2/2019 |
| KR | 101835520 | B1 | 4/2018 |
| KR | 101862860 | B1 | 5/2018 |
| WO | 2018128581 | A1 | 7/2018 |
| WO | 2019015474 | A1 | 1/2019 |

OTHER PUBLICATIONS

Exploration and practice of inter-bank application based on blockchain; 2017 12th International Conference on Computer Science and Education (ICCSE) (pp. 219-224); Tong Wu, Xiubo Liang; Aug. 22, 2017. (Year: 2017).*

Blockchain Technology in Data Management; 2020 Fourth International Conference on Computing Methodologies and Communication (ICCMC) (pp. 199-206); N.Arunkumar, P.Sivaprakasam; Mar. 11, 2020. (Year: 2020).*

First Search for Chinese Application No. 201811574828.2 dated Feb. 10, 2020.

Search Report for Taiwanese Application No. 108136238 dated Jul. 29, 2020.

Written Opinion of the International Searching Authority and International Search Report for PCT Application No. PCT/CN2019/119067 dated Mar. 2, 2020.

International Preliminary Report on Patentability Chapter 1 for PCT Application No. PCT/CN2019/119067 dated Jul. 1, 2021.

Extended European Search Report for European Application No. 19 898 178.9 dated Nov. 25, 2021.

* cited by examiner

METHOD AND DEVICE FOR DATA PROCESSING BASED ON BLOCKCHAIN

CROSS-REFERENCE TO RELATED APPLICATION

This application is a continuation application of International Patent Application No. PCT/CN2019/119067, filed with the China National Intellectual Property Administration (CNIPA) on Nov. 18, 2019, which is based on and claims priority to and benefits of Chinese Patent Application No. 201811574828.2, filed with the CNIPA on Dec. 21, 2018. The entire content of the above-identified applications is incorporated herein by reference.

TECHNICAL FIELD

The specification relates to the field of data processing technologies, and in particular, to a blockchain-based data processing method and apparatus.

BACKGROUND

The blockchain technology, also referred to as a distributed ledger technology, is an emerging technology in which a plurality of computing devices participate in "accounting" to jointly maintain a complete distributed database. Because the blockchain technology features decentralization, openness, and transparency, all the computing devices can participate in database recording, and quick data synchronization can be performed among the computing devices. Therefore, the blockchain technology has been widely applied to many fields.

SUMMARY

In view of this, one or more embodiments of the specification provide a blockchain-based data processing method and apparatus, and a computer device.

To achieve the foregoing objective, one or more embodiments of the specification provide the following technical solutions.

According to a first aspect of one or more embodiments of the specification, a blockchain-based data processing method is provided, where a blockchain includes a node device of a service acceptance platform and node devices of service data processing entities, and the method includes:

receiving, by the node device of the service acceptance platform, service processing application data of a target user;

generating, based on the service processing application data, a first shared service processing result and a first private service processing result with respect to a target service data processing entity, where the first shared service processing result includes at least a data digest of the first private service processing result;

sending a first transaction to the blockchain, where the first transaction includes the first shared service processing result, for the first transaction to be recorded in a distributed database of the blockchain after consensus verification by the blockchain; and sending the first private service processing result to a node device of the target service data processing entity, for the node device of the target service data processing entity to generate a second service processing result according to preset service processing steps, where the service processing steps include verifying the first private service processing result based on at least the first shared service processing result, and generating the second service processing result based on at least the first private service processing result after the verification succeeds.

In an embodiment, a blockchain-based data-processing method is provided. The method comprises: receiving, by a node device of a service acceptance platform, service processing application data of a target user; generating, by the node device of the service acceptance platform based on the service processing application data, a first shared service processing result and a first private service processing result with respect to a target service data processing entity, wherein the first shared service processing result comprises a data digest of the first private service processing result; sending, by the node device of the service acceptance platform, a first transaction to a blockchain for the first transaction to be recorded in a distributed database of the blockchain upon verification of the first transaction by a plurality of node devices associated with the blockchain according to a consensus mechanism, wherein the first transaction comprises the first shared service processing result and, the plurality of node devices associated with the blockchain comprises the node device of the service acceptance platform and a node device of the target service data processing entity; and sending, by the node device of the service acceptance platform, the first private service processing result to the node device of the target service data processing entity, for the node device of the target service data processing entity to generate a second service processing result.

In an embodiment, the method further comprises: obtaining, by the node device of the service acceptance platform from the distributed database of the blockchain, a second transaction comprising the second service processing result of the target user; and sending the second service processing result to the target user.

In an embodiment, the blockchain is a consortium blockchain; and the node device of the service acceptance platform and the node device of the target service data processing entity are consortium member node devices of the consortium blockchain.

In an embodiment, the service acceptance platform comprises an insurance application acceptance platform; the target service data processing entity comprises an insurance application review agency; the service processing application data comprises insurance application data of the target user; the first private service processing result comprises insurance policy application data with respect to the insurance application review agency; the first shared service processing result comprises a hash digest of the insurance policy application data; and the second service processing result comprises an insurance application result of the target user.

In an embodiment, the service acceptance platform comprises a claim settlement acceptance platform; the target service data processing entity comprises a claim settlement review agency; the service processing application data comprises claim settlement application data of the target user; the first private service processing result comprises claim settlement application data with respect to the claim settlement review agency; the first shared service processing result comprises a hash digest of the claim settlement application data; and the second service processing result comprises a compensation result for the target user.

In an embodiment, the method further comprises: receiving, by the node device of the target service data processing entity from the node device of the service acceptance platform, the first private service processing result; obtaining, by the node device of the target service data processing entity from the distributed database of the blockchain, the first transaction comprising the first shared service processing result; generating, by the node device of the target service data processing entity, the second service processing result based on the first shared service processing result and the first private service processing result; and sending, by the node device of the target service data processing entity, a second transaction to the blockchain for the second transaction to be recorded in the distributed database of the blockchain upon verification of the second transaction by the plurality of node devices associated with the blockchain according to the consensus mechanism, wherein the second transaction comprises the second service processing result.

In an embodiment, the generating the second service processing result comprises: verifying the first private service processing result based on the first shared service processing result; and in response to the verification being successful, generating the second service processing result based on the first private service processing result.

According to a second aspect of one or more embodiments of the specification, a blockchain-based data processing method is provided, where a blockchain includes a node device of a service acceptance platform and node devices of service data processing entities, and the method includes:

receiving, by a node device of a target service data processing entity, a first private service processing result sent by the node device of the service acceptance platform, where the first private service processing result is generated by the node device of the service acceptance platform based on received service processing application data of a target user;

obtaining, from a distributed database of the blockchain, a first transaction sent by the node device of the service acceptance platform, where the first transaction includes a first shared service processing result, the first shared service processing result is generated by the node device of the service acceptance platform based on the received service processing application data of the target user, and the first shared service processing result includes at least a data digest of the first private service processing result;

generating a second service processing result according to preset service processing steps, where the service processing steps include verifying the first private service processing result based at least on the first shared service processing result, and generating the second service processing result based at least on the first private service processing result after the verification succeeds; and sending a second transaction to the blockchain, where the second transaction includes the second service processing result, for the second transaction to be recorded in the distributed database of the blockchain after consensus verification by the blockchain.

According to a third aspect of one or more embodiments of the specification, a blockchain-based data processing apparatus is provided, where a blockchain includes a node device of a service acceptance platform and node devices of service data processing entities, and the apparatus includes:

a receiving unit, configured to receive service processing application data of a target user;

a data processing unit, configured to generate, based on the service processing application data, a first shared service processing result and a first private service processing result with respect to a target service data processing entity, where the first shared service processing result includes at least a data digest of the first private service processing result;

a sending unit, configured to send a first transaction to the blockchain, where the first transaction includes the first shared service processing result, for the first transaction to be recorded in a distributed database of the blockchain after consensus verification by the blockchain, and the sending unit is further configured to send the first private service processing result to a node device of the target service data processing entity, for the node device of the target service data processing entity to generate a second service processing result according to preset service processing steps, where the service processing steps include verifying the first private service processing result based at least on the first shared service processing result, and generating the second service processing result based at least on the first private service processing result after the verification succeeds.

According to a fourth aspect of one or more embodiments of the specification, a blockchain-based data processing apparatus is provided, where a blockchain includes a node device of a service acceptance platform and node devices of service data processing entities, and the apparatus includes:

a receiving unit, configured to receive a first private service processing result sent by the node device of the service acceptance platform, where the first private service processing result is generated by the node device of the service acceptance platform based on received service processing application data of a target user;

an obtaining unit, configured to obtain, from a distributed database of the blockchain, a first transaction sent by the node device of the service acceptance platform, where the first transaction includes a first shared service processing result, the first shared service processing result is generated by the node device of the service acceptance platform based on the received service processing application data of the target user, and the first shared service processing result includes at least a data digest of the first private service processing result;

a data processing unit, configured to generate a second service processing result according to preset service processing steps, where the service processing steps include verifying the first private service processing result based at least on the first shared service processing result, and generating the second service processing result based at least on the first private service processing result after the verification succeeds;

and a sending unit, configured to send a second transaction to the blockchain, where the second transaction includes the second service processing result, for the second transaction to be recorded in the distributed database of the blockchain after consensus verification by the blockchain.

According to a fifth aspect of one or more embodiments of the specification, a computer device is provided, including a memory and a processor, where the memory stores a computer program executable by the processor, and the processor, when executing the computer program, performs the blockchain-based data processing method performed by the node device of the service acceptance platform.

According to a sixth aspect of one or more embodiments of the specification, a computer device is provided, including a memory and a processor, where the memory stores a computer program executable by the processor, and the processor, when executing the computer program, performs the blockchain-based data processing method performed by the node devices of the service data processing entities.

According to a seventh aspect of one or more embodiments of the specification, a system for blockchain-based data-processing is provided. The system comprises a processor and a non-transitory computer-readable storage medium storing instructions executable by the processor to cause the system to perform operations comprising: receiving service processing application data of a target user; generating, based on the service processing application data, a first shared service processing result and a first private service processing result with respect to a target service data processing entity, wherein the first shared service processing result comprises a data digest of the first private service processing result; sending a first transaction to a blockchain for the first transaction to be recorded in a distributed database of the blockchain upon verification of the first transaction by a plurality of node devices associated with the blockchain according to a consensus mechanism, wherein: the first transaction comprises the first shared service processing result and, the plurality of node devices associated with the blockchain comprises the node device of the service acceptance platform and a node device of the target service data processing entity; and sending the first private service processing result to the node device of the target service data processing entity, for the node device of the target service data processing entity to generate a second service processing result.

According to an eighth aspect of one or more embodiments of the specification, a non-transitory computer-readable storage medium for image processing is provided. The medium is configured with instructions executable by one or more processors to cause the one or more processors to perform operations comprising: receiving service processing application data of a target user; generating, based on the service processing application data, a first shared service processing result and a first private service processing result with respect to a target service data processing entity, wherein the first shared service processing result comprises a data digest of the first private service processing result; sending a first transaction to a blockchain for the first transaction to be recorded in a distributed database of the blockchain upon verification of the first transaction by a plurality of node devices associated with the blockchain according to a consensus mechanism, wherein: the first transaction comprises the first shared service processing result and, the plurality of node devices associated with the blockchain comprises the node device of the service acceptance platform and a node device of the target service data processing entity; and sending the first private service processing result to the node device of the target service data processing entity, for the node device of the target service data processing entity to generate a second service processing result.

In the blockchain-based data processing method and apparatus provided in the specification, terminals of a service acceptance platform and data processing entities are set as node devices of a blockchain, and service processing result data obtained by both entities through processing is transmitted and obtained by using a distributed database of the blockchain, which not only ensures the timeliness of the transmitted data, but also ensures that the transmitted data is tamper-proof. In addition, in the blockchain-based data processing method and apparatus provided in the specification, privacy isolation is performed on the data stored in a blockchain system, that is, private service data is only locally stored in a node device of a corresponding service data processing entity, and non-private service data may be publicly shared in the distributed database of the blockchain.

DETAILED DESCRIPTION

The embodiments are described herein in detail, and some of the embodiments are shown in the accompanying drawings. When the following descriptions are made with reference to the accompanying drawings, unless otherwise indicated, same numbers in different accompanying drawings represent same or similar elements. The implementations described in the following embodiments are not all the implementations consistent with one or more embodiments of the specification, but are only some of methods and apparatuses that are described in detail in the appended claims and that are consistent with some aspects of one or more embodiments of the specification.

In other embodiments, the steps of corresponding methods are not necessarily performed according to sequences shown and described in the specification. In some other embodiments, the methods may include more or fewer steps than those described in the specification. In addition, a single step described in the specification may be divided into a plurality of steps for description in other embodiments, and a plurality of steps described in the specification may be combined into a single step for description in other embodiments.

Figure 1:
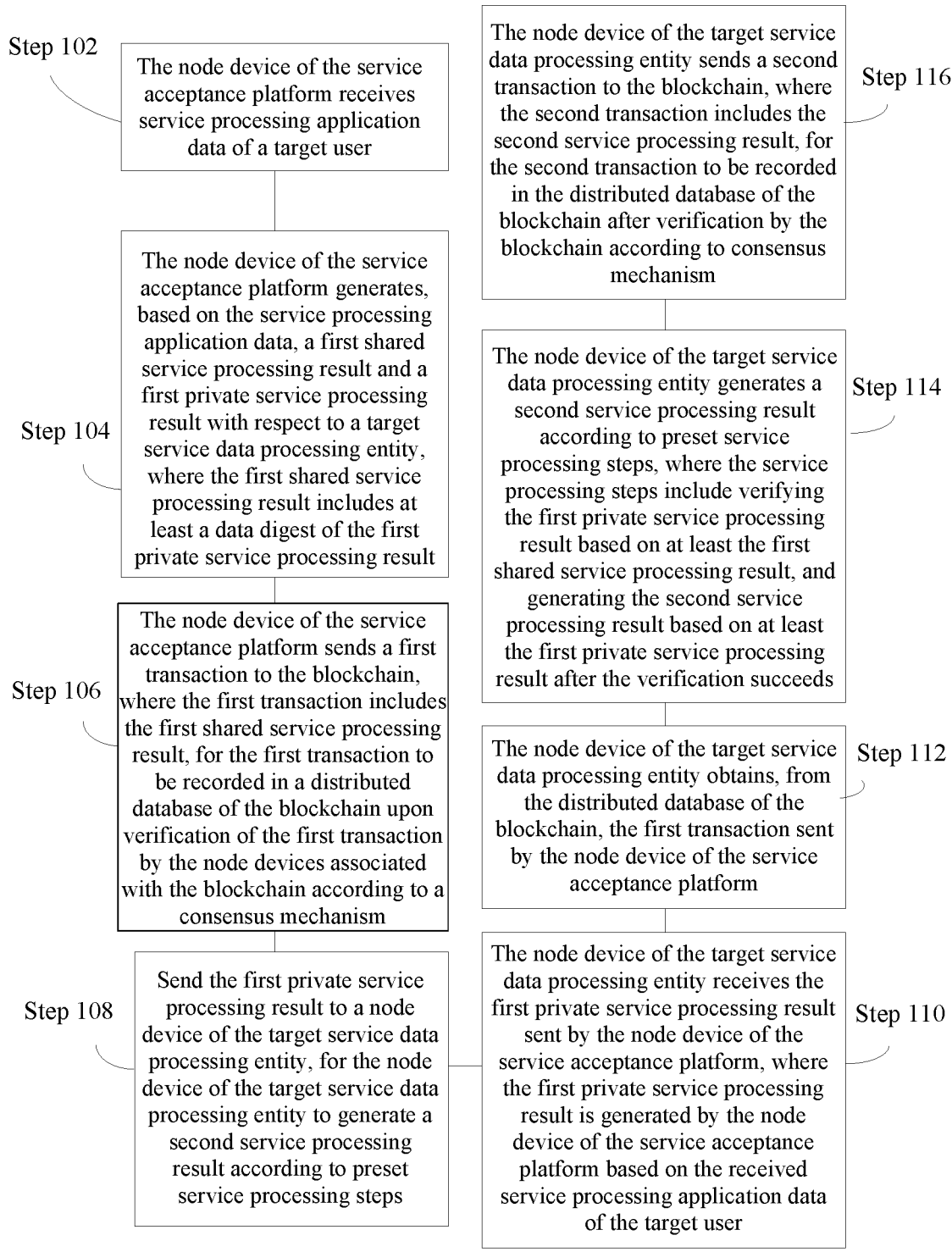
FIG. 1 is a schematic flowchart of a blockchain-based data processing method, according to an embodiment of the specification.

FIG. 1 is a schematic flowchart of a blockchain-based data processing method, according to an embodiment of the specification. The blockchain includes a node device of a service acceptance platform and node devices of service data processing entities.

A service acceptance platform described in this embodiment may include a plurality of types of user-oriented service acceptance platforms established based on a network, but not limited to, an insurance-related service acceptance platform, a financing-product-related service acceptance platform, and a supply-chain-related service acceptance platform. A service data processing entity described in this embodiment is an agency performing corresponding service processing based on a service application accepted by the service acceptance platform.

The blockchain described in this embodiment may refer to a peer-to-peer (P2P) network system with a distributed data storage structure that is constructed with nodes by using a consensus mechanism. Data in the blockchain is distributed in "blocks" connected temporally, each block contains a data digest of a previous block, and full data backup of all or some of the nodes is achieved depending on different consensus mechanisms, such as proof of work (PoW), proof of stake (PoS), delegated proof of stake (DPoS), or Practical Byzantine Fault Tolerance (PBFT). It is well known by a person skilled in the art that, because the blockchain network operates under a corresponding consensus mechanism, it is difficult for any node to tamper with data recorded in the blockchain database. For example, in a blockchain using the PoW consensus, at least 51% of computing power of the entire network is needed to tamper with existing data. Therefore, compared with other centralized database systems, the blockchain system has the unmatched characteristics of ensuring data security and preventing attacks and tampering. In the embodiments provided in the specification, data recorded in a distributed database of the blockchain will not be attacked or tampered with, which ensures authenticity and reliability of data transmission performed by the service acceptance platform and the service data processing entities based on the distributed database of the blockchain.

The node device of the service acceptance platform and the node devices of the service data processing entities described in this embodiment may join the blockchain by following a corresponding node protocol and installing a node protocol program, to serve as nodes of the blockchain. A node device with full backup of data in the distributed database of the blockchain is usually referred to as a full node by a person skilled in the art, and a node device with partial backup data (for example, only data of a block header) of the distributed database of the blockchain is referred to as a light node, a client, or the like. The node device of the service acceptance platform and the node devices of the service data processing entities described in this embodiment may include the foregoing full node, light node, or client. Any device that is directly or indirectly connected to the blockchain and that may send or obtain data in the distributed database of the blockchain may be referred to as the node device described in this embodiment.

As shown in FIG. 1, the blockchain-based data processing method includes followings.

Step 102: The node device of the service acceptance platform receives service processing application data of a target user.

The service processing application data of the target user received by the node device of the service acceptance platform described in this embodiment may include various possible Internet-based service processing application data, for example, insurance application data or claim settlement application data, financing product purchasing or redeeming application data, or product purchasing, payment, or transfer of receivables in a supply chain or financial loan application data such as mortgage loan. The target user described in this embodiment may be an individual user, or may be an institutional user.

Step 104: The node device of the service acceptance platform generates, based on the service processing application data, a first shared service processing result and a first private service processing result with respect to a target service data processing entity, where the first shared service processing result includes at least a data digest of the first private service processing result.

After accepting a service processing application of the target user, the service acceptance platform usually performs service processing in advance based on service processing steps preset by the platform and the service processing application data, to generate a service processing result. For example, an insurance application acceptance platform may generate insurance policy application data of the target user in a preset format based on insurance application data of the target user. The insurance policy application data may include data such as identity information of the target user, an insurance application type, and an insurance application qualification certificate material, for an insurance company acting as the service data processing entity to review an insurance application of the target user.

Because the insurance application information data of the target user usually includes private information of the user, for example, information data such as identify information or an insurance application qualification certificate material, to protect the privacy of the service processing result, the node device of the service acceptance platform generates, based on the preset service processing steps, the first private service processing result with respect to the target service data processing entity and the first shared service processing result to be shared in a distributed database of the blockchain. The target service data processing entity is a service data processing entity that has a permission to view and obtain the first private service processing result, which generally may be an insurance company corresponding to the insurance application or claim settlement of the user, or an operating company of a financing product that the user intends to purchase. It should be learned by a person skilled in the art that, the first shared service processing result includes at least a data digest (such as a hash digest) of the first private service processing result for attestation of the first shared service processing result.

In another embodiment, to further optimize data management, the first private service processing result may be a data modelized first private service processing result obtained by the node device of the service acceptance platform by performing data modeling processing. Therefore, all node devices (including the node device of the service acceptance platform and node devices of service data processing entities) in the blockchain can maintain a uniform data format of privacy service processing results, thereby facilitating data management, query, and application of the first private service processing result.

The process of performing data modeling on the first private service processing result may be completed by the node device of the service acceptance platform by locally executing a preset data modeling logic program. In an embodiment, the node device of the service acceptance platform may call a smart contract deployed on the blockchain to complete the data modeling process of generating the data modelized first private service processing result based on the service processing application data of the user.

Step 106: The node device of the service acceptance platform sends a first transaction to the blockchain, where the first transaction includes the first shared service processing result, for the first transaction to be recorded in a distributed database of the blockchain upon verification of the first transaction by the node devices associated with the blockchain according to a consensus mechanism.

The transaction described in the specification refers to a piece of data that is created by each user through a node device end of the blockchain and that needs to be finally published to the distributed database of the blockchain. The transaction in the blockchain includes a transaction in a narrow sense and a transaction in a broad sense. The transaction in a narrow sense refers to a value transfer published by the user to the blockchain. For example, in a conventional bitcoin blockchain network, a transaction may be a transfer initiated by the user in the blockchain. The transaction in a broad sense refers to a piece of service data with a service intent published by the user to the blockchain. For example, the transaction may be a service (such as a leasing service, a vehicle scheduling service, an insurance claim settlement service, a credit service, or a medical service) message or a service request with a service intent that is published by the user to the blockchain and that is irrelevant to value transfer. The first transaction described in this embodiment includes a piece of service data of the first shared service processing result. The first shared service processing result may be encapsulated into the first transaction according to a preset transaction format, and then the first transaction is uploaded to the blockchain.

A detail process of uploading the first transaction to the distributed database of the blockchain described in the foregoing embodiment may be set according to a consensus mechanism and a transaction rule of the blockchain. In an embodiment, the uploading the first transaction to the distributed database of the blockchain includes:

adding, by node devices with an accounting permission in the blockchain, the first transaction to a candidate block;

determining a consensus accounting node device satisfying a consensus mechanism of the blockchain from the node devices with the accounting permission;

broadcasting, by the consensus accounting node device, the candidate block to node devices of the blockchain; and setting the candidate block as a latest block after the candidate block is verified and approved by a preset quantity of node devices in the blockchain, and adding the latest block to the distributed database of the blockchain.

In the foregoing embodiment, the node device with the accounting permission refers to a node device with a permission to generate a candidate block. The consensus accounting node device may be determined from the node devices having the accounting permission with respect to the candidate block according to the consensus mechanism of the blockchain. The consensus mechanism may include a proof of work (PoW) mechanism, a proof of stake (PoS) mechanism, or a delegated proof of stake (DPoS) mechanism.

The PoS or DPoS consensus mechanism is similar to the PoW consensus mechanism and also belongs to a consensus algorithm commonly selected to determine a consensus accounting node device in a public blockchain. In another embodiment, to reduce a confirmation time of a transaction or data, improve the transaction throughput, and satisfy requirements on security and performance, the embodiments provided in the specification may further select a consortium blockchain architecture to construct the blockchain. The node devices of the service acceptance platform, of the service data processing entities, and of a service-related supervision agency may be used as preselected node devices of the consortium blockchain, to participate in accounting of blocks. A consensus process of the consortium blockchain is also controlled by the preselected no de devices. When a block is confirmed by more than a preset proportion (such as ⅔) of node devices in a network, a transaction or data recorded by the block is confirmed by the entire network.

A consensus algorithm such as proof of stake, PBFT, or RAFT is usually used in the consortium blockchain. During implementation, before each round of consensus of the blockchain starts, a primary node device, that is, the consensus accounting node device described in the foregoing embodiment, may be selected from the node devices in the blockchain (for example, a new primary node device is selected in each round of consensus, and other node devices are used as secondary node devices). The primary node device further initiates verification and consensus of a transaction, and is responsible for creating a latest block for the blockchain based on transaction data (or target data) on which a consensus is reached.

The PBFT algorithm is used as an implementation of the consensus algorithm of the consortium blockchain provided in the specification, because the algorithm has high consensus efficiency and can satisfy requirements of a high-frequency transaction amount. For example, in this embodiment, the service acceptance platform generates a corresponding first transaction based on frequently accepted user service processing applications. In addition, the PBFT algorithm has a low consensus latency, basically satisfies requirements of real-time processing, and can quickly record the foregoing first transaction in a newly-generated block of the blockchain in real time. Moreover, trusted nodes in a consortium blockchain network are used as preselected accounting nodes, thereby achieving both security and stability. In addition, the PBFT algorithm does not consume excessive computing power resources of a computer, does not necessarily require the circulation of tokens, thereby having a good usability.

Step 108: The node device of the service acceptance platform sends the first private service processing result to a node device of the target service data processing entity, for the node device of the target service data processing entity to generate a second service processing result according to preset service processing steps. The service processing steps at least include verifying the first private service processing result based on the first shared service processing result, and generating the second service processing result based on the first private service processing result after the verification succeeds.

The node device of the service acceptance platform may send the first private service processing result to the node device of the target service data processing entity by using an off-chain channel. In this way, the first private service processing result is not disclosed to other node devices in the blockchain, and the node device of the target service data processing entity generates the second service processing result according to the preset service processing steps based on the first private service processing result received by using the off-chain channel and the first shared service processing result obtained from the distributed database of the blockchain.

The preset service processing steps at least include verifying, based on the data digest of the first private service processing result included in the first shared service processing result, whether the first private service processing result obtained by using the off-chain channel corresponds to a data digest attested in the blockchain, to avoid that the first private service processing result is illegally tampered with during transmission in the off-chain channel. After the verification succeeds, the second service processing result is generated based on at least the first private service processing result (sometimes, other shared information included in the first shared service processing result is required.).

Step 110: The node device of the target service data processing entity receives the first private service processing result sent by the node device of the service acceptance platform.

The node device of the target service data processing entity may receive the first private service processing result sent by the node device of the service acceptance platform by using the off-chain channel, to prevent the first private service processing result from being disclosed to other node devices in the blockchain.

In another embodiment, to further optimize data management, the first private service processing result may be a data modelized first private service processing result obtained by the node device of the service acceptance platform by performing data modeling processing. Therefore, all node devices (including the node device of the service acceptance platform and node devices of service data processing entities) in the blockchain can maintain a uniform data format of privacy service processing results, thereby facilitating data management, query, and application of the first private service processing result.

The process of performing data modeling on the first private service processing result may be completed by the node device of the service acceptance platform by locally executing a preset data modeling logic program. In an embodiment, the node device of the service acceptance platform may call a smart contract deployed on the blockchain to complete the data modeling process of generating the data modelized first private service processing result based on the service processing application data of the user.

Step 112: The node device of the target service data processing entity obtains, from the distributed database of the blockchain, the first transaction sent by the node device of the service acceptance platform.

The node device of the target service data processing entity may synchronize a latest block based on a latest block generating frequency decided by the consensus mechanism of the blockchain, to obtain the first transaction. The first transaction includes the first shared service processing result, and the first shared service processing result is generated by the node device of the service acceptance platform based on the received service processing application data of the target user. The blockchain based on a consortium blockchain architecture usually has high transaction processing throughput and data can be written into the blockchain almost in real time, thereby improving the efficiency of service processing.

In addition, the first shared service processing result includes at least a data digest (such as a hash digest) of the first private service processing result for attestation of the first shared service processing result.

Step 114: The node device of the target service data processing entity generates a second service processing result according to preset service processing steps, where the service processing steps include verifying the first private service processing result based on at least the first shared service processing result, and generating the second service processing result based on at least the first private service processing result after the verification succeeds.

The preset service processing steps at least include verifying, based on the data digest of the first private service processing result included in the first shared service processing result, whether the first private service processing result obtained by using the off-chain channel corresponds to a data digest attested in the blockchain, to avoid that the first private service processing result is illegally tampered with during transmission in the off-chain channel.

After the verification performed on the first private service processing result succeeds, the node device of the target service data processing entity may further generate the second service processing result based on at least the first private service processing result. In an embodiment, when the first shared service processing result further includes some basic service information, the node device of the target service data processing entity may further generate the second service processing result based on the first private service processing result and the first shared service processing result.

Step 116: The node device of the target service data processing entity sends a second transaction to the blockchain, where the second transaction includes the second service processing result, for the second transaction to be recorded in the distributed database of the blockchain after verified by the blockchain according to a consensus mechanism.

For example, the node device of the target service data processing entities may encapsulate the second service processing result into a second transaction according to a preset transaction format and send the second transaction to the blockchain. Because the second service processing result is visible in the distributed database of the blockchain, the second service processing result may not involve private information of a related target user or target service processing agency, while the target service processing agency may store a data processing result involving the private information into a local database.

A process of recording the second transaction in the distributed database of the blockchain is similar to a process of recording the first transaction in the distributed database of the blockchain.

In another embodiment, because the service acceptance platform is usually used as a platform on which service acceptance and feedback are performed for the target user, the blockchain-based data processing method may further include step 118 (not shown in FIG. 1): the node device of the service acceptance platform obtains, from the distributed database of the blockchain, a second transaction sent by the node device of the target service data processing entity, where the second transaction includes a second service processing result of the target user, sends the second service processing result to the target user.

The target user in this embodiment may also benefit from the timeliness of data uploading or synchronization on the blockchain in the foregoing embodiment, to effectively obtain a service processing result (that is, the second service processing result) of a service processing application in a timely manner, thereby improving service use experience of the target user.

The terminal device of the target user, such as a PC terminal or a mobile device terminal, may also be used as a node device of the blockchain, and directly obtain the second service processing result from the distributed database of the blockchain.

By using step 102 to step 116 in this embodiment, the service acceptance platform and the target service data processing entity complete transmission of the first service processing result and the second service processing result based on the blockchain. This embodiment not only ensures the timeliness of the transmitted data, but also ensures that data backed up on the blockchain is tamper-poof. In addition, the first private service processing result may be transmitted by using an off-chain channel, and the data digest of the first private service processing result is attested in the distributed database of the blockchain, thereby achieving isolation for data privacy, and avoiding impact of adverse events such as data tampering.

The following describes the blockchain-based data processing method provided in the specification in detail by using the following service architectural mode: an insurance claim settlement platform as a front end to insurance claim settlement agencies as a back end.

Figure 2:
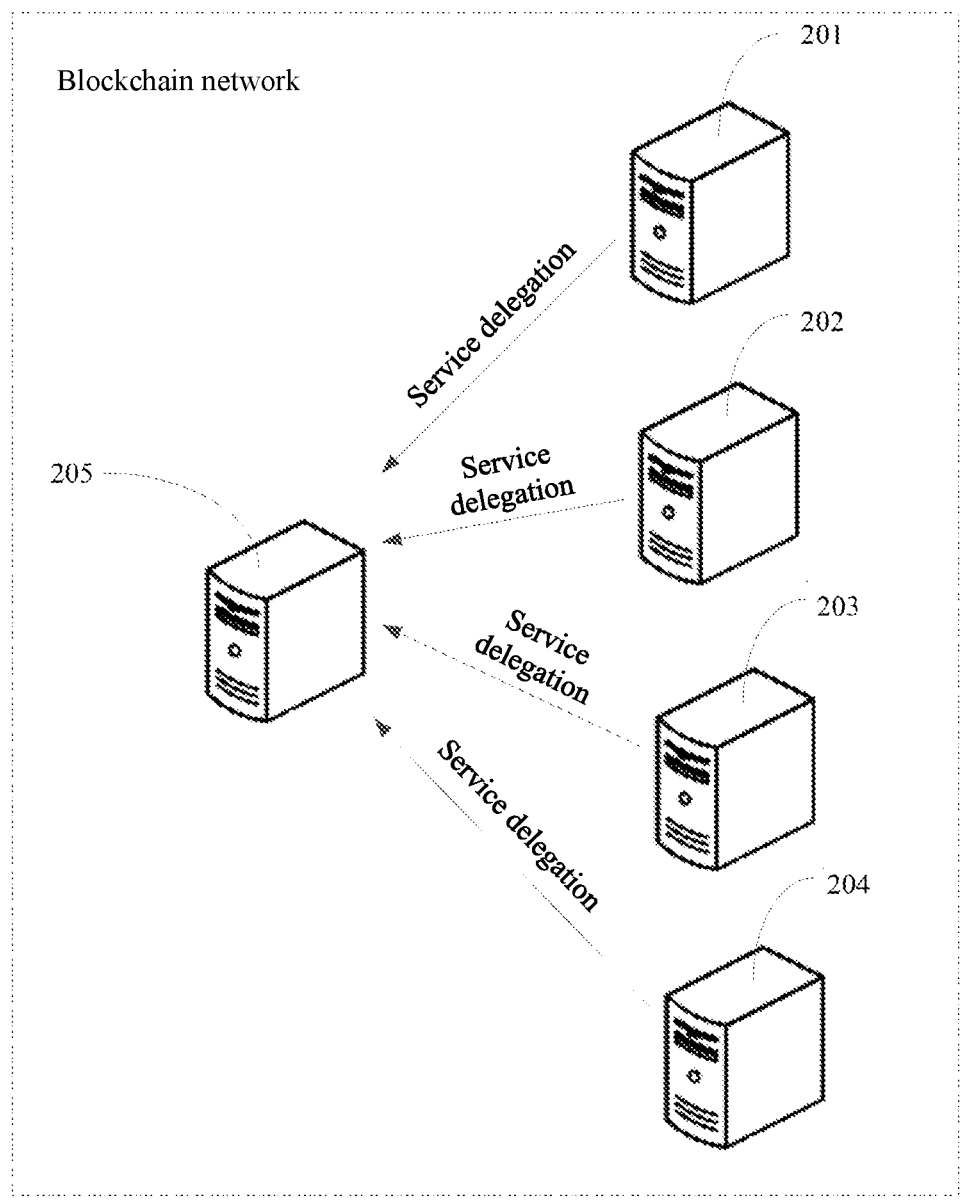
FIG. 2 is a schematic diagram of an organization structure of node devices performing an insurance application service or an insurance claim settlement service in a blockchain network, according to an embodiment of the specification.

As shown in FIG. 2, one insurance platform may be connected to a plurality of insurance companies, to receive insurance applications of users and accept claim settlements. Correspondingly, the plurality of insurance companies may review the insurance applications of the users and review the claim settlements. Terminal devices 201 to 204 of the plurality of insurance companies and a terminal device 205 of the insurance platform all join in the blockchain network as the node devices of the blockchain, and transmit service data based on the distributed database of the blockchain.

Figure 3:
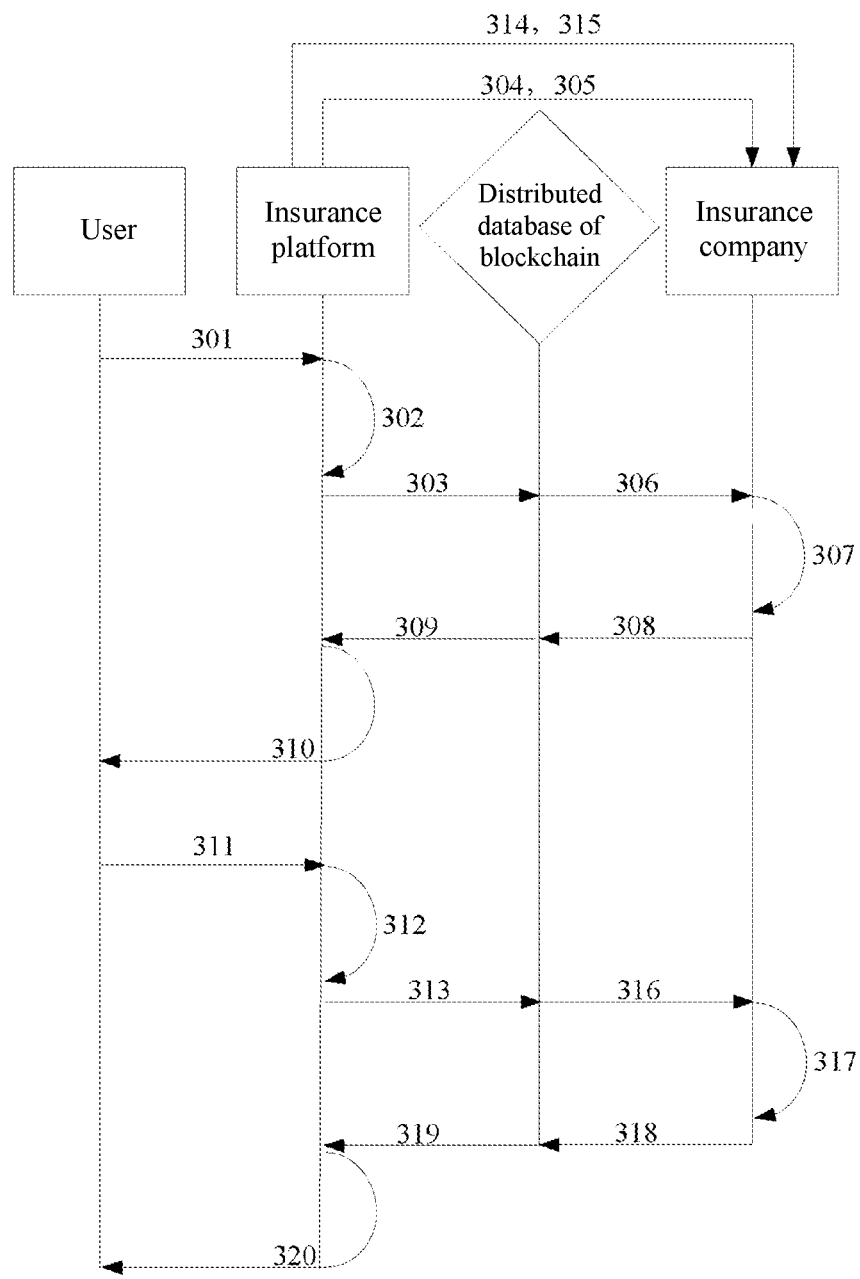
FIG. 3 is a flowchart of an insurance application service and an insurance claim settlement service performed in a blockchain network, according to an embodiment of the specification.

FIG. 3 shows a process of processing an insurance application service of a user and a claim settlement service of a user by the foregoing node device 201 of an insurance company and the foregoing node device 205 of the insurance platform.

Step 301: A target user initiates an insurance application for an insurance product based on a client of an insurance platform installed on a terminal device of the target user.

Step 302: The insurance platform generates, based on the insurance application of the target user, a first private service processing result and a first shared service processing result with respect to a target insurance company. For example, by performing process steps, such as accepting an insurance application, obtaining insurance application data, charging an insurance application fee (which may be a pre-charged premium, where the final actual premium is charged by an insurance company agency after performing insurance underwriting according to the conditions of the target user), and generating insurance policy format data, the insurance platform generates insurance policy application data of the insurance product of the target insurance company that is purchased by the target user, to use the insurance policy application data as the first private service processing result, and the insurance platform generates a hash digest of the first private service processing result as at least a portion of the first shared service processing result.

Step 303: A node device of the insurance platform encapsulates the first shared service processing result generated in the foregoing step into a first transaction, and sends the first transaction to the blockchain. Based on a consensus and verification mechanism of the blockchain, the first transaction is recorded in a distributed database of the blockchain after consensus verification.

Step 304: The node device of the insurance platform sends, by using an off-chain channel, the first private service processing result generated in the foregoing step to the target insurance company providing the insurance product. In an embodiment, before transmission of the first private service processing result, the node device of the insurance platform performs data modeling processing on the first private service processing result by calling a smart contract that is used for data modeling processing and that is deployed in the blockchain, to facilitate data type management on the first private service processing result in the entire system (including the node device of the insurance platform and node devices of service data processing entities).

Step 305: A supplier of the insurance product purchased by the target user, that is, a node device of the target insurance company, receives the first private service processing result by using the off-chain channel.

Step 306: The node device of the target insurance company synchronously updates the distributed database of the blockchain, and obtains the first transaction from the database. As described above, the first shared service processing result included in the first transaction includes at least a hash digest of the first private service processing result.

Step 307: The node device of the target insurance company generates an insurance application result of the target user, such as a notification of insurance application success information, a notification of a premium amount, a notification of insurance quota information, or a notification of insurance application failure information, according to preset insurance application result generating steps. The process steps may include: first performing, based on the hash digest of the first private service processing result included in the first shared service processing result, corresponding verification on the first private service processing result received by using the off-chain channel, and after the verification succeeds, checking authenticity and effectiveness of a certificate material of the target user included in the insurance policy application data, performing accounting on a premium of the target user, assigning an insurance policy number to the insurance policy application data, and signing and approving the insurance policy application data.

Step 308: The node device of the target insurance company encapsulates the insurance application result of the target user into an insurance application result transaction (second transaction) of the target user, and sends the insurance application result transaction to the blockchain. Based on the consensus and verification mechanism of the blockchain, the insurance application result transaction is recorded in the distributed database of the blockchain after verification according to consensus mechanism.

Step 309: The node device of the insurance platform synchronously updates the distributed database of the blockchain, and obtains the insurance application result transaction from the database.

Step 310: The node device of the insurance platform notifies the target user of a user insurance application result, or updates an insurance application status of the target user or the like on the platform according to the insurance application result in the insurance application result transaction.

Step 301 to step 310 illustrate a process in which the target user uses the blockchain-based data processing method provided in the specification in an insurance application scenario. Similarly, the blockchain-based data processing method provided in the specification may also be used in a claim settlement scenario of the target user. For example, the method includes:

Step 311: A target user initiates, based on a client of an insurance platform installed on a terminal device of the target user, a claim settlement application of an insurance product purchased by the target user.

Step 312: The insurance platform generates, based on claim settlement application data of the target user, a first private service processing result and a first shared service processing result with respect to a target insurance company. For example, the insurance platform generates claim settlement report data of the target user according to process steps such as processing a claim examination material and accepting a report, to use the claim settlement report data as the first private service processing result, and the insurance platform generates a hash digest of the first private service processing result as at least a portion of the first shared service processing result.

In an embodiment, the first shared service processing result may further include a claim settlement certificate, such as accident invoice information, included in the claim settlement application data of the target user, to avoid that the target user claims settlement repeatedly based on the same claim settlement certificate. In addition, a paid-compensation record or remaining compensable amount of the target user with respect to the insurance policy may be generated based on the accident invoice information attested in the distributed database of the blockchain and a claim settlement amount included in the insurance application information in step 308.

Step 313: A node device of the insurance platform encapsulates the first shared service processing result generated in the foregoing step into a first transaction, and sends the first transaction to the blockchain. Based on a consensus and verification mechanism of the blockchain, the first transaction is recorded in a distributed database of the blockchain after verification according to consensus mechanism.

Step 314: The node device of the insurance platform sends, by using an off-chain channel, the first private service processing result generated in the foregoing step to the target insurance company that performs claim settlement based on the insurance product. In an embodiment, before transmission of the first private service processing result, the node device of the insurance platform performs data modeling processing on the first private service processing result by calling a smart contract that is used for data modeling processing and that is deployed in the blockchain, to facilitate data type management on the first private service processing result in the entire system (including the node device of the insurance platform and node devices of service processing parties).

Step 315: A claimant of the insurance product corresponding to the claim settlement application of the target user, that is, a node device of the target insurance company, receives the first private service processing result by using the off-chain channel.

Step 316: The node device of the target insurance company synchronously updates the distributed database of the blockchain, and obtains the first transaction from the database. As described above, the first shared service processing result included in first transaction includes at least a hash digest of the first private service processing result. As described above, the first transaction may further include certificate information of the claim settlement application of the target user.

Step 317: The node device of the insurance company generates a compensation result of the target user, for example, notification information that the claim settlement review succeeds, a compensation amount, notification information that the claim settlement fails, information of causes of failed claim settlement, or other data, according to preset compensation result generating steps. The process steps may include: first performing, based on the hash digest of the first private service processing result included in the first shared service processing result, corresponding verification on the first private service processing result received by using the off-chain channel, and after the verification succeeds, checking authenticity and effectiveness of a claim settlement certificate material of the target user included in the first private service processing result, performing accounting on a claim settlement amount for a claim settlement certificate included in the first shared service processing result.

Step 318: The node device of the target insurance company encapsulates the compensation result of the target user into a compensation result transaction (second transaction), and sends the compensation result transaction to the blockchain. Based on the consensus and verification mechanism of the blockchain, the compensation result transaction is recorded in the distributed database of the blockchain after verification according to consensus mechanism.

Step 319: The node device of the insurance platform synchronously updates the distributed database of the blockchain, and obtains the compensation result transaction from the database.

Step 320: The node device of the insurance platform notifies the target user of the notification information that the claim settlement review succeeds, the compensation amount, the notification information that the claim settlement fails, the information of causes of failed claim settlement, or the like according to the compensation result in the compensation result transaction.

When a terminal of the target user is also a node device of the blockchain, the node device of the insurance company may remit (or referred to as transfer), based on the compensation amount included in the compensation result, an asset certificate corresponding to the compensation amount to a blockchain account of the target user on the blockchain. The asset certificate may correspond to smart assets such as tokens or digital assets in the blockchain, or may correspond to off-chain assets such as cash, securities, coupons, or house property outside the blockchain. A payment result of the compensation may also be included in the scope of the compensation result.

Corresponding to the embodiments of the foregoing processes, an embodiment of the specification further provides blockchain-based data processing apparatuses 40 and 50. The apparatus 40 or 50 may be implemented by software, hardware, or a combination of software and hardware. Using software implementation as an example, a logical apparatus is formed by reading a corresponding computer program instruction and writing the instruction into an internal memory for running through a central processing unit (CPU) of a device on which the apparatus is located. From a hardware perspective, in addition to the CPU, internal memory, and memory shown in FIG. 6, the device at which the apparatus for implementing a blockchain-based data-processing apparatus is located usually includes other hardware, such as a chip for wireless signal transmission and receiving, and/or other hardware, such as a board card for implementing network communication functions.

Figure 4:
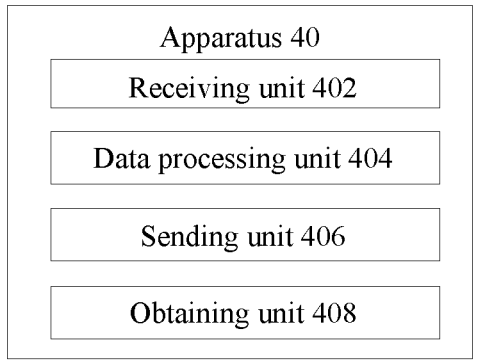
FIG. 4 is a schematic diagram of a data processing apparatus applied to a node device end of a service acceptance platform, according to an embodiment of the specification.

FIG. 4 shows a blockchain-based data processing apparatus 40. A blockchain includes a node device of a service acceptance platform and node devices of service data processing entities, and the apparatus 40 includes:

a receiving unit 402, configured to receive service processing application data of a target user;

a data processing unit 404, configured to generate, based on the service processing application data, a first shared service processing result and a first private service processing result with respect to a target service data processing entity, where the first shared service processing result includes at least a data digest of the first private service processing result; and a sending unit 406, configured to send a first transaction to the blockchain, where the first transaction includes the first shared service processing result, for the first transaction to be recorded in a distributed database of the blockchain after verification by the blockchain according to consensus mechanism, and the sending unit 406 is further configured to send the first private service processing result to a node device of the target service data processing entity, for the node device of the target service data processing entity to generate a second service processing result according to preset service processing steps, where the service processing steps include verifying the first private service processing result based on at least the first shared service processing result, and generating the second service processing result based on at least the first private service processing result after the verification succeeds.

In another embodiment, the apparatus 40 further includes:

an obtaining unit 408, configured to obtain, from the distributed database of the blockchain, a second transaction sent by the node device of the target service data processing entity, where the second transaction includes the second service processing result of the target user, and the sending unit 406 is further configured to send the second service processing result to the target user.

In another embodiment, the first private service processing result is a data modelized first private service processing result.

In another embodiment, the node device of the service acceptance platform is a node device of an insurance application acceptance platform, the node devices of the service data processing entities are node devices of insurance application review agencies, and the service processing application data of the target user is insurance application data of the target user.

The first private service processing result is insurance policy application data with respect to a target insurance application review agency, and the first shared service processing result is a hash digest of the insurance policy application data.

The second service processing result is an insurance application result of the target user obtained by a node device of the target insurance application review agency through processing.

In another embodiment, the node device of the service acceptance platform is a node device of a claim settlement acceptance platform, the node devices of the service data processing entities are node devices of claim settlement review agencies, and the service processing application data of the target user is claim settlement application data of the target user.

The first private service processing result includes claim settlement application data with respect to a target claim settlement review agency, and the first shared service processing result includes a hash digest of the claim settlement application data.

The second service processing result includes a compensation result for the target user obtained by a node device of the target claim settlement review agency through processing.

In another embodiment, the blockchain is a consortium blockchain, and the node device of the service acceptance platform and the node devices of the service data processing entities are consortium member node devices.

Figure 5:
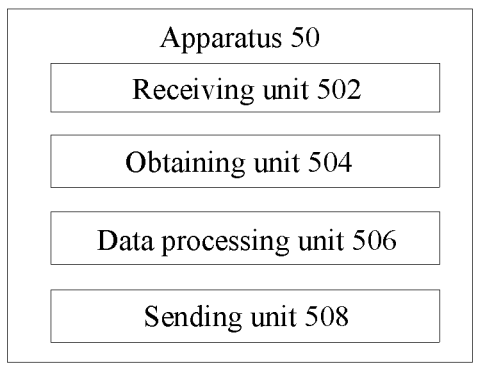
FIG. 5 is a schematic diagram of a data processing apparatus applied to a node device end of a service data processing entity, according to an embodiment of the specification.

FIG. 5 shows a blockchain-based data processing apparatus 50. A blockchain includes a node device of a service acceptance platform and node devices of service data processing entities, and the apparatus 50 includes:

a receiving unit 502, configured to receive a first private service processing result sent by the node device of the service acceptance platform, where the first private service processing result is generated by the node device of the service acceptance platform based on received service processing application data of a target user;

an obtaining unit 504, configured to obtain, from a distributed database of the blockchain, a first transaction sent by the node device of the service acceptance platform, where the first transaction includes a first shared service processing result, and the first shared service processing result is generated by the node device of the service acceptance platform based on the received service processing application data of the target user, where the first shared service processing result includes at least a data digest of the first private service processing result;

a data processing unit 506, configured to generate a second service processing result according to preset service processing steps, where the service processing steps include verifying the first private service processing result based on at least the first shared service processing result, and generating the second service processing result based on at least the first private service processing result after the verification succeeds; and a sending unit 508, configured to send a second transaction to the blockchain, where the second transaction includes the second service processing result, for the second transaction to be recorded in the distributed database of the blockchain after verification by the blockchain according to consensus mechanism.

In another embodiment, the first private service processing result is a data modelized first private service processing result.

In another embodiment, the node device of the service acceptance platform is a node device of an insurance application acceptance platform, the node devices of the service data processing entities are node devices of insurance application review agencies, and the service processing application data of the target user is insurance application data of the target user.

The first private service processing result is insurance policy application data with respect to a target insurance application review agency, and the first shared service processing result is a hash digest of the insurance policy application data.

The second service processing result is an insurance application result of the target user obtained by a node device of the target insurance application review agency through processing.

In another embodiment, the node device of the service acceptance platform is a node device of a claim settlement acceptance platform, the node devices of the service data processing entities are node devices of claim settlement review agencies, and the service processing application data of the target user is claim settlement application data of the target user.

The first private service processing result includes claim settlement application data with respect to a target claim settlement review agency, and the first shared service processing result includes a hash digest of the claim settlement application data.

The second service processing result includes a compensation result for the target user obtained by a node device of the target claim settlement review agency through processing.

For details of the implementation processes of the functions and effects of the units in the apparatuses 40 and 50, reference may be made to the implementation processes of corresponding steps in the foregoing method. Related parts may be referred to partial descriptions in the method embodiment.

The apparatus embodiments described above are merely some of the embodiments. The units described as separate parts may or may not be physically separate, and the parts displayed as units may or may not be physical modules, may be located in one position, or may be distributed on a plurality of network modules. Some or all of the units or modules may be selected according to actual requirements to achieve the objectives of the solutions of the specification. A person of ordinary skill in the art may understand and implement the solutions without creative efforts.

The apparatus, the unit or the module described in the foregoing embodiments can be implemented by a computer chip or an entity or implemented by a product having a certain function. A typical implementation device is a computer, and the computer may be in a form of a personal computer, a laptop computer, a cellular phone, a camera phone, a smartphone, a personal digital assistant, a media player, a navigation device, an email device, a game console, a tablet computer, a wearable device, or a combination of any of these devices.

Figure 6:
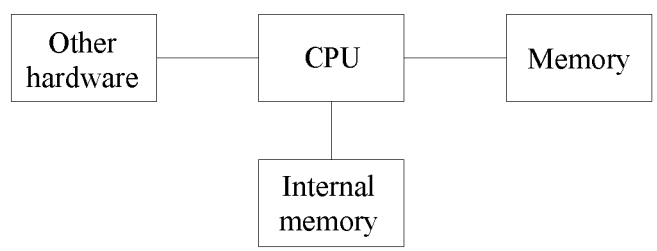
FIG. 6 is a diagram of a hardware structure executing a blockchain-based data processing apparatus, according to an embodiment of the specification.

Corresponding to the method embodiment, an embodiment of the specification further provides a computer device. As shown in FIG. 6, the computer device includes a memory and a processor. The memory stores a computer program runnable by the processor. The processor, when running the computer program, performs the steps of the blockchain-based data processing method performed by a node device end of a service acceptance platform in the embodiments of the specification. Detailed descriptions of the steps of the blockchain-based data processing method performed by the node device end of the service acceptance platform, may be referred to previous content.

Corresponding to the method embodiment, an embodiment of the specification further provides a computer device. As shown in FIG. 6, the computer device includes a memory and a processor. The memory stores a computer program runnable by the processor. The processor, when running the computer program, performs the steps of the blockchain-based data processing method performed by a node device end of service data processing entities in the embodiments of the specification. Detailed descriptions of the steps of the blockchain-based data processing method performed by the node device end of the service data processing entities, may be referred to previous content.

The foregoing descriptions are some embodiments of the specification, but do not limit the specification. Any modification, equivalent replacement, or improvement made without departing from the spirit and principle of the specification fall within the protection scope of the specification.

In a typical configuration, a computing device includes one or more processors (CPUs), an input/output interface, a network interface, and an internal memory.

The internal memory may include the following forms of computer-readable media: a non-persistent memory, a random access memory (RAM), and/or a nonvolatile internal memory, for example, a read-only memory (ROM) or a flash memory (flash RAM). The internal memory is an example of the computer-readable medium.

The computer-readable medium includes a persistent medium and a non-persistent medium, a removable medium and a non-removable medium, which may implement storage of information by using any method or technology. The information may be computer-readable instructions, a data structure, a module of a program, or other data.

Examples of computer storage media include but are not limited to a phase change memory (PRAM), a static random access memory (SRAM), a dynamic random access memory (DRAM), another type of RAM, a ROM, an electrically erasable programmable read-only memory (EEPROM), a flash memory or other internal memory technology, a compact disc read-only memory (CD-ROM), a digital versatile disc (DVD) or other optical storage, a cassette magnetic tape, tape and disk storage or other magnetic storage device or any other non-transmission media that may be configured to store information accessible by the computing device. According to the definition in the specification, the computer-readable medium does not include transitory computer-readable media (transitory media) such as a modulated data signal and a carrier.

It should also be noted that the terms "include," "comprise" and any other variants mean to cover the non-exclusive inclusion. Therefore, the process, method, article, or device that includes a series of elements not only includes those elements, but also includes other elements not clearly listed, or includes the elements inherent to the process, method, article or device. Without further limitation, the element defined by a phrase "include one . . . " does not exclude other same elements in the process, method, article, or device that includes the element.

A person skilled in the art should understand that the embodiments of the specification may be provided as a method, a system, or a computer program product. Therefore, the embodiments of the specification may use a form of hardware only embodiments, software only embodiments, or embodiments with a combination of software and hardware. Moreover, the embodiments of the specification may use a form of a computer program product that is implemented on one or more computer-usable storage media (including but not limited to a disk memory, a CD-ROM, an optical memory, and the like) that include computer-usable program code.

What is claimed is:

1. A blockchain-based data-processing method, comprising:
  receiving, by a node device of a service acceptance platform, service processing application data of a target user;
  processing, by the node device of the service acceptance platform, the received service processing application data, generating a first shared service processing result and a first private service processing result with respect to a target service data processing entity, and performing data modeling processing on the first private service processing result to obtain a modelized first private service processing result by changing a format of the first private service processing result to a uniform data format, wherein the first shared service processing result comprises a data digest of the first private service processing result;
  sending, by the node device of the service acceptance platform, a first transaction to a blockchain for the first transaction to be recorded in a distributed database of the blockchain upon verification of the first transaction by a plurality of node devices associated with the blockchain according to a consensus mechanism, wherein:
  the first transaction comprises the first shared service processing result; and
  the plurality of node devices associated with the blockchain comprises the node device of the service acceptance platform and a node device of the target service data processing entity; and
  sending, by the node device of the service acceptance platform, the modelized first private service processing result to the node device of the target service data processing entity through an off-chain channel that is external to the blockchain,
  wherein the node device of the target service data processing entity receives the modelized first private service processing result through the off-chain channel, obtains the first shared service processing result from the distributed database of the blockchain, verifies the modelized first private service processing result based on the data digest, and generates a second service processing result based on the modelized first private service processing result obtained through the off-chain channel and the first shared service processing result obtained from the distributed database upon verification of the modelized first private service processing result.

2. The method of claim 1, further comprising:
obtaining, by the node device of the service acceptance platform from the distributed database of the blockchain, a second transaction comprising the second service processing result of the target user; and
sending the second service processing result to the target user.

3. The method of claim 1, wherein:
the blockchain is a consortium blockchain; and
the node device of the service acceptance platform and the node device of the target service data processing entity are consortium member node devices of the consortium blockchain.

4. The method according to claim 1, wherein:
the service acceptance platform comprises an insurance application acceptance platform;
the target service data processing entity comprises an insurance application review agency;
the service processing application data comprises insurance application data of the target user;
the first private service processing result comprises insurance policy application data with respect to the insurance application review agency;
the first shared service processing result comprises a hash digest of the insurance policy application data; and
the second service processing result comprises an insurance application result of the target user.

5. The method according to claim 1, wherein:
the service acceptance platform comprises a claim settlement acceptance platform;
the target service data processing entity comprises a claim settlement review agency;
the service processing application data comprises claim settlement application data of the target user;
the first private service processing result comprises claim settlement application data with respect to the claim settlement review agency;
the first shared service processing result comprises a hash digest of the claim settlement application data; and
the second service processing result comprises a compensation result for the target user.

6. The method of claim 1, wherein:
the obtaining the first shared service processing result comprises obtaining the first transaction comprising the first shared service processing result;
the generating a second service processing result comprises generating the second service processing result based on the first shared service processing result and the modelized first private service processing result; and
the method further comprises sending, by the node device of the target service data processing entity, a second transaction to the blockchain for the second transaction to be recorded in the distributed database of the blockchain upon verification of the second transaction by the plurality of node devices associated with the blockchain according to the consensus mechanism, wherein the second transaction comprises the second service processing result.

7. The method of claim 1, wherein the data digest of the first private service processing result is attested in the distributed database of the blockchain.

8. A system for blockchain-based data-processing, comprising a processor and a non-transitory computer-readable storage medium storing instructions executable by the processor to cause the system to perform operations comprising:

receiving service processing application data of a target user;
processing the received service processing application data, generating a first shared service processing result and a first private service processing result with respect to a target service data processing entity, and performing data modeling processing on the first private with respect to a target service data processing entity, and performing data modeling processing on the first private service processing result to obtain a modelized first private service processing result by changing a format of the first private service processing result to a uniform data format, wherein the first shared service processing result comprises a data digest of the first private service processing result;
sending a first transaction to a blockchain for the first transaction to be recorded in a distributed database of the blockchain upon verification of the first transaction by a plurality of node devices associated with the blockchain according to a consensus mechanism, wherein:
the first transaction comprises the first shared service processing result; and
the plurality of node devices associated with the blockchain comprises the node device of the service acceptance platform and a node device of the target service data processing entity; and
sending the modelized first private service processing result to the node device of the target service data processing entity through an off-chain channel that is external to the blockchain,
wherein the node device of the target service data processing entity receives the modelized first private service processing result through the off-chain channel, obtains the first shared service processing result from the distributed database of the blockchain, verifies the modelized first private service processing result based on the data digest, and generates a second service processing result based on the modelized first private service processing result obtained through the off-chain channel and the first shared service processing result obtained from the distributed database upon verification of the modelized first private service processing result.

9. The system according to claim 8, wherein the operations further comprise:
obtaining, from the distributed database of the blockchain, a second transaction comprising the second service processing result of the target user; and
sending the second service processing result to the target user.

10. The system according to claim 8, wherein:
the blockchain is a consortium blockchain; and
the node device of the service acceptance platform and the node device of the target service data processing entity are consortium member node devices of the consortium blockchain.

11. The system according to claim 8, wherein:
the service acceptance platform comprises an insurance application acceptance platform;
the target service data processing entity comprises an insurance application review agency;
the service processing application data comprises insurance application data of the target user;
the first private service processing result comprises insurance policy application data with respect to the insurance application review agency;

the first shared service processing result comprises a hash digest of the insurance policy application data; and the second service processing result comprises an insurance application result of the target user.

12. The system according to claim 8, wherein:

the service acceptance platform comprises a claim settlement acceptance platform;

the target service data processing entity comprises a claim settlement review agency;

the service processing application data comprises claim settlement application data of the target user;

the first private service processing result comprises claim settlement application data with respect to the claim settlement review agency;

the first shared service processing result comprises a hash digest of the claim settlement application data; and the second service processing result comprises a compensation result for the target user.

13. The system according to claim 8, wherein:

the obtaining the first shared service processing result comprises obtaining the first transaction comprising the first shared service processing result;

the generating a second service processing result comprises generating the second service processing result based on the first shared service processing result and the modelized first private service processing result; and the operations further comprise sending a second transaction to the blockchain for the second transaction to be recorded in the distributed database of the blockchain upon verification of the second transaction by the plurality of node devices associated with the blockchain according to the consensus mechanism, wherein the second transaction comprises the second service processing result.

14. The system according to claim 8, wherein the data digest of the first private service processing result is attested in the distributed database of the blockchain.

15. A non-transitory computer-readable storage medium for image processing, configured with instructions executable by one or more processors to cause the one or more processors to perform operations comprising:

receiving service processing application data of a target user;

processing the received service processing application data, generating a first shared service processing result and a first private service processing result with respect to a target service data processing entity, and performing data modeling processing on the first private with respect to a target service data processing entity, and performing data modeling processing on the first private service processing result to obtain a modelized first private service processing result by changing a format of the first private service processing result to a uniform data format, wherein the first shared service processing result comprises a data digest of the first private service processing result;

sending a first transaction to a blockchain for the first transaction to be recorded in a distributed database of the blockchain upon verification of the first transaction by a plurality of node devices associated with the blockchain according to a consensus mechanism, wherein:

the first transaction comprises the first shared service processing result; and the plurality of node devices associated with the blockchain comprises the node device of the service acceptance platform and a node device of the target service data processing entity; and sending the modelized first private service processing result to the node device of the target service data processing entity through an off-chain channel that is external to the blockchain, wherein the node device of the target service data processing entity receives the modelized first private service processing result through the off-chain channel, obtains the first shared service processing result from the distributed database of the blockchain, verifies the modelized first private service processing result based on the data digest, and generates a second service processing result based on the modelized first private service processing result obtained through the off-chain channel and the first shared service processing result obtained from the distributed database upon verification of the modelized first private service processing result.

16. The medium according to claim 15, wherein the operations further comprise:

obtaining, from the distributed database of the blockchain, a second transaction comprising the second service processing result of the target user; and sending the second service processing result to the target user.

17. The medium according to claim 15, wherein:

the blockchain is a consortium blockchain; and the node device of the service acceptance platform and the node device of the target service data processing entity are consortium member node devices of the consortium blockchain.

18. The medium according to claim 15, wherein:

the service acceptance platform comprises an insurance application acceptance platform;

the target service data processing entity comprises an insurance application review agency;

the service processing application data comprises insurance application data of the target user;

the first private service processing result comprises insurance policy application data with respect to the insurance application review agency;

the first shared service processing result comprises a hash digest of the insurance policy application data; and the second service processing result comprises an insurance application result of the target user.

19. The medium according to claim 15, wherein:

the service acceptance platform comprises a claim settlement acceptance platform;

the target service data processing entity comprises a claim settlement review agency;

the service processing application data comprises claim settlement application data of the target user;

the first private service processing result comprises claim settlement application data with respect to the claim settlement review agency;

the first shared service processing result comprises a hash digest of the claim settlement application data; and the second service processing result comprises a compensation result for the target user.

20. The medium according to claim 15, wherein:

the obtaining the first shared service processing result comprises obtaining the first transaction comprising the first shared service processing result;

the generating a second service processing result comprises generating the second service processing result based on the first shared service processing result and the modelized first private service processing result; and
the operations further comprise sending a second transaction to the blockchain for the second transaction to be recorded in the distributed database of the blockchain upon verification of the second transaction by the plurality of node devices associated with the blockchain according to the consensus mechanism, wherein the second transaction comprises the second service processing result.

* * * * *